United States Patent [19]

Schipfer et al.

[11] Patent Number: 5,554,700
[45] Date of Patent: Sep. 10, 1996

[54] CATALYZED CATIONIC LACQUER BINDER, PROCESS FOR PRODUCING THE SAME AND ITS USE

[75] Inventors: Rudolf Schipfer; Gerhard Schmoelzer; Edmund Urbano, all of Graz, Austria

[73] Assignee: Vianova Resins AG, Graz, Austria

[21] Appl. No.: 343,448

[22] PCT Filed: May 27, 1993

[86] PCT No.: PCT/AT93/00091

§ 371 Date: Nov. 28, 1994

§ 102(e) Date: Nov. 28, 1994

[87] PCT Pub. No.: WO93/24578

PCT Pub. Date: Dec. 9, 1993

[30] Foreign Application Priority Data

May 29, 1992 [AT] Austria ............................. 1122/92
Dec. 24, 1992 [AT] Austria ............................. 2571/92

[51] Int. Cl.⁶ .................................................. C08F 8/30
[52] U.S. Cl. ........................ 525/360; 204/504; 204/506; 204/508; 523/415; 528/48
[58] Field of Search .......................... 204/181.4, 181.7, 204/504, 506, 508; 523/415; 524/901; 525/360, 438, 533; 528/45.48

[56] References Cited

U.S. PATENT DOCUMENTS

| 4,007,154 | 2/1977 | Schimmel et al. | 260/37 |
| 4,009,133 | 2/1977 | Jones | 260/29.2 |
| 4,040,924 | 8/1977 | Jones | 204/181 |
| 4,081,343 | 3/1978 | Schimmel et al. | 204/181 |
| 4,427,805 | 1/1984 | Kooijmans et al. | 523/417 |
| 4,683,285 | 7/1987 | Paar et al. | 528/113 |
| 4,785,068 | 11/1988 | Tominaga et al. | 528/45 |

FOREIGN PATENT DOCUMENTS

| 1097449 | 3/1981 | Canada. |
| 0107098 | 5/1984 | European Pat. Off.. |
| 0107088 | 5/1984 | European Pat. Off.. |
| 0138193 | 4/1985 | European Pat. Off.. |
| 0107089 | 5/1987 | European Pat. Off.. |
| 0264834 | 1/1991 | European Pat. Off.. |
| 0251772 | 9/1991 | European Pat. Off.. |
| 0336599 | 11/1992 | European Pat. Off.. |
| 2634229 | 1/1982 | Germany. |
| 2634211 | 10/1982 | Germany. |

OTHER PUBLICATIONS

J. H. Saunders et al., Polyurethanes, Chemistry and Technology, in High Polymers, vol. XVI, Part I, Jul. 1967, p. 167.

*Primary Examiner*—Melvyn I. Marquis
*Assistant Examiner*—D. Aylward
*Attorney, Agent, or Firm*—Foley & Lardner

[57] ABSTRACT

Catalysed, cationic compositions which contain one or more catalysed, cationic binders which can be diluted in water after being protonated and which contain one or more bismuth salts of hydroxycarboxylic acids are disclosed. The bismuth salts of lactic acid and dimethylolpropionic acid are particularly preferred, and the compositions are useful in cathodically precipitated paints.

18 Claims, No Drawings

CATALYZED CATIONIC LACQUER BINDER, PROCESS FOR PRODUCING THE SAME AND ITS USE

BACKGROUND OF THE INVENTION

1. Field of the Invention

The invention relates to catalysed cationic paint binders which are water-thinable after protonation and contain bismuth salts of aliphatic hydroxycarboxylic acids, to a process for the preparation of these binders and to their use.

2. Description of Related Art

Cationic paint binders, employed in particular in the formulation of cathodic electrodeposition coatings, crosslink at elevated temperature to a significant extent by transesterification, transamidation, transurethanisation or by the reaction of terminal double bonds.

It is known that such crosslinking reactions are catalysed by metal compounds. Catalysis of this kind is necessary in virtually every case for the curing of cathodically deposited coating films, in order to achieve the profile of properties required by industrial users.

The most important of the catalysts conventionally used in current practice are lead compounds and tin compounds. However, the use of toxic or ecologically objectionable lead compounds or tin compounds is being increasingly made more difficult, and a ban on the use of such substances is to be expected.

There is therefore a particular need for physiologically and ecologically more acceptable catalysts which can be employed in cathodic electrodeposition coatings.

It has long been known that bismuth compounds catalyse the formation of urethane structures from isocyanate and hydroxyl groups (J. H. SAUNDERS and K. C. FRISCH, Polyurethanes, Chemistry and Technology, in High Polymers, Vol. XVI, Part I, Interscience Publishers, a divison of John Wiley and Sons, New York, Fourth Printing, July 1967, page 167).

Lists of metals suitable for use in electrode-position coatings also include bismuth, for example in EP-A2-138,193 and in EP-A1-0,264,834.

EP-A2-138,193 describes the use of the salts, specifically the acetates, of preferably divalent metals for improving the solubility of polymers.

In EP-A1-0,264,834, it is attempted to achieve a homogeneous distribution of metal salts or organometallic compounds in polymer microparticles either by an "impregnation" procedure, by polymerisation in the presence of the stated metal compounds or by copolymerisation of ethylenically unsaturated metal compounds.

The choice of bismuth compounds which can be used in electrodeposition coatings is in principle severely restricted. The more readily available salts of relatively long-chain acids, such as Bi octanoate or Bi neodecanoate, when employed in cationic binders, cause defects in the coating film due to oil-like exudations. Inorganic bismuth compounds are difficult to distribute by mixing into the binder or into a pigment paste, and in this form are of low catalytic activity.

SUMMARY OF THE INVENTION

It has now been found that, surprisingly, combinations of cathodically depositable paint binders containing specific bismuth salts have, in the form of appropriately formulated coatings, excellent application and film properties, so that the use of lead compounds and tin compounds can be dispensed with.

The invention accordingly relates to catalysed cationic paint binders which are water-thinable after protonation and are characterised in that they contain cationic paint binders which are crosslinkable by transesterification and/or transamidation and/or transurethanisation and/or by reaction of terminal double bonds, and bismuth salts of aliphatic hydroxycarboxylic acids.

The invention further relates to a process for the preparation of the catalysed coating binders and to their use in the formulation of cathodic electrodeposition coatings.

The invention finally relates to cathodic electrodeposition coatings which contain the catalysed paint binders in the form of pigment pastes and contain further paint binders, the latter having a chemical structure which is identical to or different from that of the paint binders prepared in accordance with the invention and being present, if appropriate, as dispersions.

DETAILED DESCRIPTION

Bismuth salts which have proven particularly suitable are bismuth lactate and the bismuth salt of dimethylolpropionic acid (2,2-bis-(hydroxymethyl)propionic acid). These compounds are highly compatible with conventional cationic binders, the content of bismuth based on the solids content of the paint binder being from 0.1 to 5.0% by weight, preferably 0.5 to 3.0% by weight.

The catalysed paint binders are prepared by adding, prior to the addition of significant amounts of water as diluent, the bismuth salt in portions to the protonated binder solution at 60° to 80° C., and subsequently homogenising the mixture with stirring at 60° to 100° C., preferably at 60° to 70° C., for several hours, preferably for 4 to 8 hours.

When lactic acid or dimethylolpropionic acid is used as the neutralising agent for the cationic paint binder, the bismuth salts can be replaced partly or wholly by employing the corresponding amount of bismuth oxide or bismuth hydroxide, whereby the bismuth salt used in accordance with the invention is formed in situ.

A great number of paint binders which can be catalysed using the process according to the invention are known from the literature. Consequently, a more detailed discussion of the structure and of the chemistry of these products is not necessary. This also applies to the formulation and processing of the corresponding pigment pastes and coatings.

In a particular embodiment, the bismuth salt is homogenised in a paint binder which can be used as paste resin in a dissolver at 30° to 60° C. for 15 to 60 minutes and then in a bead mill, in the presence of pigments if appropriate, for 0.5 to 1.5 hours.

Cationic paint binders which can be used as paste resin and are crosslinkable by transesterification and/or transamidation and/or transurethanisation and/or by reaction of terminal double bonds are described in numerous references, for example in DE 2,634,211 C2, DE-A-2,634,229, EP 107,088 A1, EP 107,089 A1, EP 107,098 A1, EP 251,772 A2, EP 336,599 A2 and Austrian Patent 80,264.

The content of bismuth, based on the solids content of the paint binder which can be used as paste resin, is 0.5 to 25% by weight, preferably 1.5 to 20% by weight.

The catalysed paint binders which can be used as paste resins are converted by known methods into the corresponding pigment pastes, which are combined for the formulation of cathodically depositable electrodeposition coatings with further paint binders, the latter having a chemical structure which is identical to or different to that of the paste resins and being present, if appropriate, as dispersions.

The examples illustrate the invention without limiting its scope. All data in parts and percentages relate to units by weight.

The following abbreviations are used in the examples:

| EGL | ethylene glycol monoethyl ether |
| --- | --- |
| DEAPA | diethylaminopropylamine |
| CE | the glycidyl ester of a $C_9$-$C_{11}$-tert-monocarboxylic acid |
| BUGL | ethylene glycol monobutyl ether |
| MP | methoxypropanol |
| TDI | tolylene diisocyanate (commercial isomer mixture) |
| DGDME | diethylene glycol dimethyl ether |
| PF 91 | paraformaldehyde, 91 % |

PREPARATION OF THE BINDER COMPONENTS:

Base resin B1:

190 g of a bisphenol A epoxy resin (epoxide equivalent 190) and 1425 g of a bisphenol A epoxy resin (epoxide equivalent 475) are dissolved at 100° C. in 597 g of EGL. The solution is cooled to 60° C. and 126 g of diethanolamine are added. The temperature is raised slowly over 2 hours to 80° C. 169 g of DEAPA are then added. The temperature is raised over 2 hours to 120° C. At this temperature 478 g of CE are added, the mixture is stirred for 5 hours at 130° C. and finally diluted with EGL to a solids content of 65% by weight. The resin has an amine value of 91 mg of KOH/g and a hydroxyl number of 265 mg of KOH/g, in each case based on the solids.

Base resin B2:

2 g of azobisisobutyronitrile are dissolved in 40 g of isopropanol with heating. At the reflux temperature (about 84° C.) of this clear solution, a monomer mixture consisting of 20 g of glycidyl methacrylate, 20 g of hydroxyethyl methacrylate, 20 g of methyl methacrylate and 40 g of 2-ethylhexyl acrylate, in which 2 g of azobisisobutyronitrile are dissolved to leave a clear solution, is added at a uniform rate over 2 hours. The reaction mixture is stirred for a further 3 hours at reflux temperature. A homogeneous solution of 16 g of diisopropanolamine in 20 g of BUGL is then added rapidly at 85° C. to the reaction mixture, which is stirred for 2 hours more at 90° C., and the product is finally diluted at 90° C. with 13 g of EGL and at 40° C. with acetone.

The resin has a solids content of 57% by weight, an amine value of 58 mg of KOH/g and a hydroxyl value of 250 mg of KOH/g, in each case based on the solids.

Base resin B3:

570 g (3 eq) of an epoxy resin based on bisphenol A (epoxide equivalent 190) and 317 g of MP are heated to 60° C.; over 2 hours, a mixture of 116 g (0.9 eq) of ethylhexylamine and 163 g (0.15 NH-eq) of a polymeric amine (see below) is added, and the mixture is reacted to an meq value of 2.06. Subsequently 1330 g (2.1 eq) of a 75% solution of a bisphenol A epoxy resin (epoxide equivalent 475) in MP are added. After this a solution of 189 g (1.8 eq) of diethanolamine in 176 g of MP is added at 60° C over one hour and the reaction is continued to an meq value of 1.57. After further addition of a solution of 78 g (1.2 eq) of DEAPA in 54 g of MP over one hour, the reaction is continued at 60° C. to an meq value of 1.46. The temperature is raised to 90° C. and then, over a further hour, to 120° C.

On reaching a viscosity (GARDNER-HOLD 6 g of resin + 4 g of MP) of I-J, the mixture is diluted with MP to a solids content of 65% by weight. The product has an amine value of 117 mg of KOH/g and a hydroxyl number of 323 mg of KOH/g, in each case based on the solids.

The polymeric amine is prepared by reacting 1 mol of diethylenetriamine with 3.1 mol of 2-ethylhexyl glycidyl ether and 0.5 mol of a bisphenol A epoxy resin (expoxide equivalent 190) in 80% solution in MP. The product has a viscosity (DIN 53211/20° C.; 100 g of resin+30 g of MP) of 60 to 80 seconds.

Crosslinking Component CC 1:

In a reaction vessel fitted with a device suitable for azeotropic procedures and with a bubble-cap column for removing the alcohol component formed in the partial transesterification, 29.7 g (0.9 mol) of 91% paraformaldehyde are added in portions at 80° C. to a mixture of 160 g (1 mol) of diethyl malonate, 0.34 g (0.004 mol) of piperidine and 0.22 g (0.004 mol) of 85% formic acid such that, at the onset of the exothermic reaction, a temperature of 95° C. is not exceeded. The reaction mixture is stirred at 95° C. until the paraformaldehyde is completely dissolved. As water begins to be eliminated, the temperature is raised to 110° C. over 2 hours. After reaching 110° C. mineral spirit (boiling range 80°–120° C.) is added as an entraining agent and a total of 9 g of water are removed by distillation. By applying a vacuum, the entraining agent employed is then removed.

After the addition of 22.8 g (0.3 mol) of 1,2-propylene glycol the batch is heated until distillation begins (140°–150° C.). With the temperature increasing, 27 parts (0.6 mol) of ethanol are distilled off. The resulting product has a solids content (120° C., 30 minutes) of about 92% by weight, an OH number of below 5 mg of KOH/g, an intrinsic viscosity value of approximately 5.2 ml/g (20° C., dimethylformamide) and a refractive index $n_D^{20}$ of 1.4670.

Crosslinking Component CC 2:

The reaction product of 134 g (1 mol) of trimethylolpropane with 851 g (2.8 mol) of a TDI semi-blocked with 2-ethylhexanol, in 70% solution in DGDME.

Crosslinking Component CC 3:

134 g (1 mol) of trimethylolpropane are added to 160 g (1 mol) of diethyl malonate and heated until distillation begins (about 140°–150° C.). With the temperature rising (up to 180° C.), 46 g (1 mol) of ethanol are distilled off. When reaction has finished, the mixture is diluted with 128 g of DGDME and cooled to 60° C. 264 g (1 mol or 1 NCO-equivalent) of a reaction product of 1 mol of TDI and 1 mol of EGL are then added over 4 hours and reacted at 60° C. to an NCO content of less than 0.02 milliequivalents per g of sample.

The resulting product has a solids content of 80±2% by weight (30 minutes, 120° C.), a viscosity according to GARDNER-HOLD (10 g of product+2 g of DGDME) of K and a refractive index $n_D^{20}$ of 1.4960.

Paste resin P1:

(corresponding to Example 2 of AT Patent 380,264)

In a reaction vessel equipped with stirrer, thermometer, addition funnel, water separator and reflux condenser, 320 parts of an epoxy resin based on polypropylene glycol (equivalent weight about 320) are reacted at 75° to 80° C. with 134 parts of tallow fatty amine and 52 parts of DEAPA to an epoxide value of 0. After addition of 30 parts of PF 91, mineral spirit (boiling range 80° to 120° C.) is added and 19 parts of the water of reaction are removed azeotropically. The entraining agent is then distilled off under vacuum.

Paste resin P2:

(corresponding to Example 1 of EP 0,107,098 B1)

302 parts of a reaction product of 286 parts of a dimerised fatty acid with 127 parts of dimethylaminopropylamine (about 2 hours at 135° to 140° C., removal of the excess amine under vacuum) and 209 parts of 2-butoxyethanol are heated to 50° C. in a suitable reaction vessel. After the addition of 90 parts of 88% lactic acid the temperature is held at 55° to 65° C. for about 15 minutes. This procedure is repeated after adding 72 parts of deionised water. Finally 128 parts of butyl glycidyl ether are added. The batch is held for a further 2 hours at 75° to 85° C. The reaction product has a solids content of about 62% by weight.

Preparation of the Bismuth Compounds a) Bismuth formate:

466 parts (1 mol) of bismuth oxide+379 parts (7 mol) of formic acid, 85% in water+1126 parts of water b) Bismuth acetate:

466 parts (1 mol) of bismuth oxide+420 parts (7 mol) of acetic acid+1332 parts of water c) Bismuth lactate:

466 parts (1 mol) of bismuth oxide+901 parts (7 mol) of lactic acid, 70% in water d) Bismuth dimethylolpropionate:

466 parts (1 mol) of bismuth oxide+938 parts (7 mol) of dimethylolpropionic acid+2154 parts of water e) Bismuth salicylate: 466 parts (1 mol) of bismuth oxide+ 966 parts (7 mol) of salicylic acid+2135 parts of water The deionised water and acid are placed in a vessel and heated to 70° C. Commercially available bismuth oxide ($Bi_2O_3$) is added in portions with stirring. After stirring for a further 6 hours at 70° C. the mixture is cooled to about 20° C.

EXAMPLES 1 to 13

Preparation and Testing of the Catalysed Coating Systems

Examples 1 to 9 and 11 to 13 (Table 1) contain combinations of binders with various bismuth salts. In Example 10, a lead catalyst (lead octanoate) corresponding to the prior art is employed for comparison.

The binder components are mixed at 60° C. in a ratio of 70 parts of base resin to 30 parts of crosslinking component (based on solid substances). Then the acid is added, the amount of neutralising agent necessary for the mixture to be readily soluble in water having been determined in preliminary experiments. The mixture is heated to 70° C. and the bismuth compound is added in portions with stirring over 2 hours. The mixture is then stirred for a further 6 hours at 60°–70° C. and finally diluted with methoxypropanol to a solids content of 65% by weight.

In Examples 1 and 6, commercially available bismuth oxide and bismuth hydroxide respectively instead of the bismuth lactate are added to the binder combination neutralised with lactic acid.

To test for the required homogeneous and stable distribution, the products are further diluted with methoxypropanol to a solids content of 50% by weight. After 24 hours the formation of sediment is assessed.

Using the products of Examples 1 to 13, pigmented paints are prepared in a conventional manner with a solids content of 18% by weight, corresponding to the formulation 100 parts of binder (solids), 39.5 parts of titanium oxide and 0.5 part of colour black. From these paints, films having a dry film thickness of 20±2 μm are cathodically deposited on zinc-phosphatised steel panels and stoved for 20 minutes at temperatures of 160°, 170° and 180° C.

To test the stoved films for their resistance to acetone, a cotton wool pad soaked with acetone is placed on the coating film and the time after which the film can be damaged by scratching with a finger nail is determined.

The impact resistance of the films is tested according to ERICHSEN (ASTM-D 2794).

The corrosion resistance of the films is determined in the salt spray test according to ASTM B-117-64. The value given is the time until corrosion occurs to a total extent of 3 mm at the cut.

The results are compiled in Table 2.

TABLE 1

| Example No | Base Resin | Curing Agent | Acid | Metal compounds | Metal content in % by wt. | Compatibility after 24 hours |
| --- | --- | --- | --- | --- | --- | --- |
| 1 | B 3 | CC 3 | Lactic acid | Bi oxide | 1.5 | OK |
| 2 | B 3 | CC 2 | Lactic acid | Bi lactate | 1.5 | OK |
| 3 | B 1 | CC 2 | Acetic acid | Bi acetate | 1.5 | Sediment |
| 4 | B 3 | CC 3 | Acetic acid | Bi formate | 1.5 | Sediment |
| 5 | B 3 | CC 3 | Lactic acid | Bi dimethylol-propionate | 1.5 | OK |
| 6 | B 2 | CC 2 | Lactic acid | Bi hydroxide | 1.5 | OK |
| 7 | B 3 | CC 3 | Lactic acid | Bi salicylate | 1.5 | Sediment |
| 8 | B 1 | CC 1 | Lactic acid | Bi dimethylol-propionate | 1.5 | OK |
| 9 | B 1 | CC 2 | Lactic acid | Bi lactate | 1.5 | OK |
| 10 | B 1 | CC 1 | Formic acid | Pb octanoate | 1.5 | OK |
| 11 | B 3 | CC 2 | Lactic acid | Bi lactate | 0.15 | OK |
| 12 | B 1 | CC 2 | Lactic acid | Bi lactate | 3.0 | OK |
| 13 | B 1 | CC 1 | Lactic acid | Bi dimethylol-propionate | 5.0 | OK |

[1]) based on the solids content of the total paint binder

TABLE 2

| Example No | Acetone test (seconds) | | | Impact (inch/pound) | | | Salt spray test (hours) | | |
| --- | --- | --- | --- | --- | --- | --- | --- | --- | --- |
| | 160° C. | 170° C. | 180° C. | 160° C. | 170° C. | 180° C. | 160° C. | 170° C. | 180° C. |
| 1 | 20 | 80 | 150 | 5 | 40 | >80 | 500 | 1000 | >1000 |
| 2 | 60 | >180 | >180 | 10 | >80 | >80 | 800 | >1000 | >1000 |
| 3 | 1 | 1 | 10 | <5 | <5 | 10 | <300 | <300 | <300 |

TABLE 2-continued

| Example | Acetone test (seconds) | | | Impact (inch/pound) | | | Salt spray test (hours) | | |
|---|---|---|---|---|---|---|---|---|---|
| No | 160° C. | 170° C. | 180° C. | 160° C. | 170° C. | 180° C. | 160° C. | 170° C. | 180° C. |
| 4 | 5 | 5 | 10 | <5 | 5 | 20 | <300 | <300 | <300 |
| 5 | 50 | >180 | >180 | 10 | >80 | >80 | 800 | >1000 | >1000 |
| 6 | 10 | 60 | 160 | 5 | 30 | >80 | 800 | 1000 | >1000 |
| 7 | 1 | 1 | 10 | <5 | >5 | 5 | <300 | <300 | <300 |
| 8 | 20 | 60 | >180 | >80 | >80 | >80 | 500 | >1000 | >1000 |
| 9 | 120 | >180 | >180 | >80 | >80 | >80 | 800 | >1000 | >1000 |
| 10 | 50 | >120 | >180 | 5 | 60 | >80 | 500 | 1000 | >1000 |
| 11 | 5 | 5 | 60 | >5 | >5 | >80 | >300 | 500 | 1000 |
| 12 | >180 | >180 | >180 | >80 | >80 | >80 | >1000 | >1000 | >1000 |
| 13 | >180 | >180 | >180 | >80 | >80 | >80 | >1000 | >1000 | >1000 |

EXAMPLES 14 to 17

Preparation and Testing of the Catalysed Coating Systems Using Catalysed Paste Resins
Preparation of a Binder Solution:

70 parts of base resin B1 and 30 parts of cross-linking component CC 2 (based on solid substances) are mixed at 60° C. After neutralisation with lactic acid (45 mmol per 100 g of binder solids) the mixture is diluted with deionised water to a solids content of 50% by weight.

EXAMPLE 14

275 parts of paste resin P1 are mixed with 22.7 parts of lactic acid and 56 parts of bismuth oxide at about 50° C. for 30 minutes in a dissolver and milled for one hour in a bead mill (bismuth content of 18.0% by weight, based on the solids content of paste resin P1).

The mixture is then diluted with 1552 parts of water. After addition of 16 parts of colour black and 1584 parts of titanium dioxide the mixture is again milled for one hour on a bead mill. 636 parts of this pigment paste are dispersed in 4364 parts of the above-described binder solution. The pigmented paint has a solids content of about 18% by weight (bismuth content of 1.4% by weight, based on the solids content of the total paint binder).

EXAMPLE 15

458 parts of paste resin P2 are mixed with 231 parts of bismuth dimethylolpropionate (metal content 12%) at about 45° C. for 30 minutes in a dissolver (bismuth content of 10% by weight, based on the solids content of paste resin P2).

The mixture is then diluted with 1193 parts of water. After addition of 16 parts of colour black and 1601 parts of titanium dioxide, the mixture is again mixed for 30 minutes in a dissolver and milled for one hour on a bead mill. 636 parts of this pigment paste are dispersed in 4364 parts of the above-described binder solution. The pigmented paint has a solids content of about 18% by weight (bismuth content of 0.9% by weight, based on the total solids content of the coating binder).

EXAMPLE 16

275 parts of paste resin P1 are mixed with 60.0 parts of lactic acid and 77 parts of bismuth oxide at about 50° C. for 30 minutes in a dissolver and milled for one hour in a bead mill (bismuth content of 25.0% by weight, based on the solids content of paste resin P1).

The mixture is then diluted with 1537 parts of water. After addition of 16 parts of colour black and 1584 parts of titanium dioxide the mixture is again milled for one hour on a bead mill. 636 parts of this pigment paste are dispersed in 4364 parts of the above-described binder solution. The pigmented paint has a solids content of about 18% by weight (bismuth content of 1.4% by weight, based on the solids content of the total paint binder).

EXAMPLE 17

458 parts of paste resin P2 are mixed with 12 parts of bismuth dimethylolpropionate (metal content of 12%) at about 45° C. for 30 minutes in a dissolver (bismuth content of 0.5% by weight, based on the solids content of paste resin P2).

The mixture is then diluted with 1193 parts of water. After addition of 16 parts of colour black and 1601 parts of titanium dioxide the mixture is again mixed for 30 minutes in a dissolver and milled for one hour in a bead mill. 636 parts of this pigment paste are dispersed in 4364 parts of the above-described binder solution. The pigmented paint has a solids content of about 18% by weight (bismuth content of 0.15% by weight, based on the solids content of the total paint binder).

The applicational tests on the paint were carried out in the same way as for Examples 1 to 13. The results are compiled in Table 3.

TABLE 3

| Example | Acetone test (seconds) | | | Impact (inch/pound) | | | Salt spray test (hours) | | |
|---|---|---|---|---|---|---|---|---|---|
| No | 160° C. | 170° C. | 180° C. | 160° C. | 170° C. | 180° C. | 160° C. | 170° C. | 180° C. |
| 14 | 30 | 150 | >180 | 5 | 60 | >80 | 300 | 1000 | >1000 |
| 15 | 50 | >180 | >180 | 20 | >80 | >80 | 500 | >1000 | >1000 |
| 16 | 120 | >180 | >180 | 60 | >80 | >80 | 1000 | >1000 | >1000 |
| 17 | 5 | 20 | 150 | 5 | 5 | >80 | 300 | 500 | 1000 |

We claim:
1. A catalysed cationic coating composition which is water-thinnable after protonation, wherein said composition comprises one or more cationic paint binders that is crosslinkable by transesterification and/or transamidation and/or transurethanisation and/or by reaction of terminal double bonds, and one or more bismuth salt of an aliphatic hydroxycarboxylic acid.

2. A catalysed cationic coating composition as claimed in claim 1, wherein said bismuth salt of aliphatic hydroxycarboxylic acid is selected from bismuth salts of lactic acid or dimethylolpropionic acid.

3. A catalysed cationic coating composition as claimed in claim 2, wherein said bismuth salt comprises from 0.1 to 5.0% by weight of bismuth based on the solids content of the paint binder.

4. A catalysed cationic coating composition as claimed in claim 3, wherein said bismuth salt comprises from 0.5 to 3.0% by weight of bismuth based on the solids content of the paint binder.

5. A catalysed cationic coating composition as claimed in claim 2, wherein said composition is a paste resin and said bismuth salt comprises from 0.5 to 25% by weight of bismuth based on the solids content of the paint binder.

6. A catalysed cationic coating composition as claimed in claim 5, wherein said composition is a paste resin and said bismuth salt comprises from 1.5 to 20% by weight of bismuth based on the solids content of the paint binder.

7. A process for preparing a catalysed cationic coating composition as claimed in claim 2, comprising:

adding said bismuth salt portionwise to the cationic paint binder at 60° to 80° C to prepare a mixture;

homogenizing said mixture with stirring at 60° to 100° C; and then adding water as a diluent.

8. A process as claimed in claim 7, wherein said mixture is homogenized for 4 to 8 hours.

9. A process as claimed in claim 7, wherein the cationic paint binder is neutralized with lactic acid or dimethylolpropionic acid, and wherein the bismuth salt of the acid is wholly or partly replaced by the corresponding amounts of bismuth oxide or bismuth hydroxide and homogenized.

10. A process for preparing catalysed cationic coating composition as claimed in claim 5, comprising:

homogenizing said bismuth salts in the cationic paint binder using a dissolver at 30 to 60° C. for 15 to 60 minutes to prepare a partially homogenized mixture; and then homogenizing said partially homogenized mixture in a bead mill in the presence of at least one pigment for 0.5 to 1.5 hours.

11. A process as claimed in claim 10, wherein the cationic paint binder is neutralized with lactic acid or dimethylolpropionic acid, and wherein the bismuth salt of the acid is wholly or partly replaced by the corresponding amounts of bismuth oxide or bismuth hydroxide and homogenized.

12. A cathodically depositable electrodeposition paint comprising a catalysed cationic coating composition as claimed in claim 2.

13. A cathodically depositable electrodeposition paint comprising (i) a catalysed cationic coating composition prepared according to the process of claim 10, and (ii) an additional paint binder, wherein said additional binder can be the same or different from the binder used in the process of claim 10.

14. A cathodically depositable electrodeposition paint comprising a catalysed cationic coating composition as claimed in claim 5.

15. A catalysed cationic coating composition as claimed in claim 2, wherein said bismuth salt is a bismuth salt of lactic acid.

16. A catalysed cationic coating composition as claimed in claim 2, wherein said bismuth salt is a bismuth salt of dimethylolpropionic acid.

17. A catalysed cationic coating composition as claimed in claim 5, wherein said bismuth salt is a bismuth salt of lactic acid.

18. A catalysed cationic coating composition as claimed in claim 5, wherein said bismuth salt is a bismuth salt of dimethylolpropionic acid.

* * * * *